A. H. HALSTEAD.
CORN PLANTER.
APPLICATION FILED NOV. 25, 1911.
1,028,110.
Patented June 4, 1912.
3 SHEETS—SHEET 1.
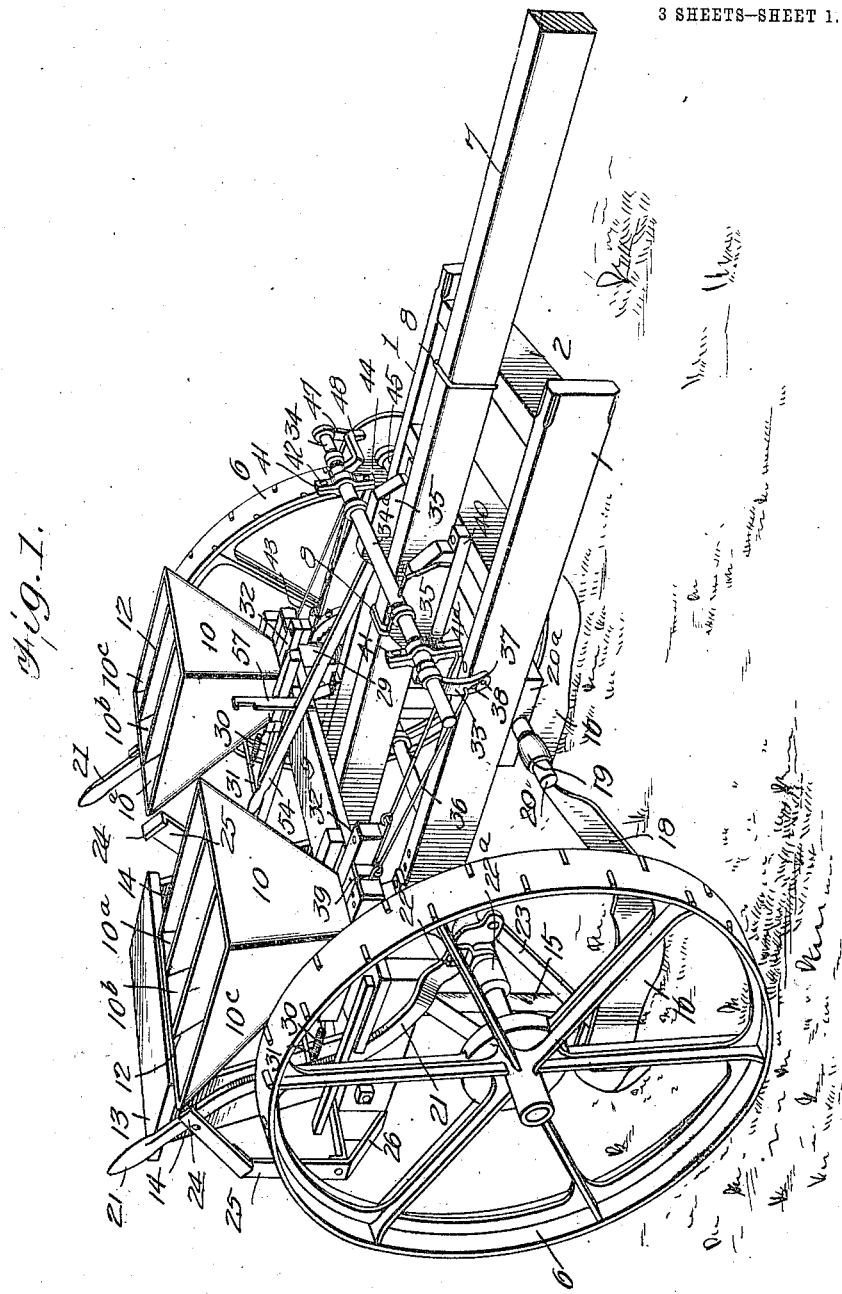
WITNESSES
H. E. Barry
A. E. Trainer
INVENTOR
Allen H. Halstead
BY Munn & Co.
ATTORNEYS A. H. HALSTEAD.
CORN PLANTER.
APPLICATION FILED NOV. 25, 1911.
1,028,110.
Patented June 4, 1912.
3 SHEETS—SHEET 2.
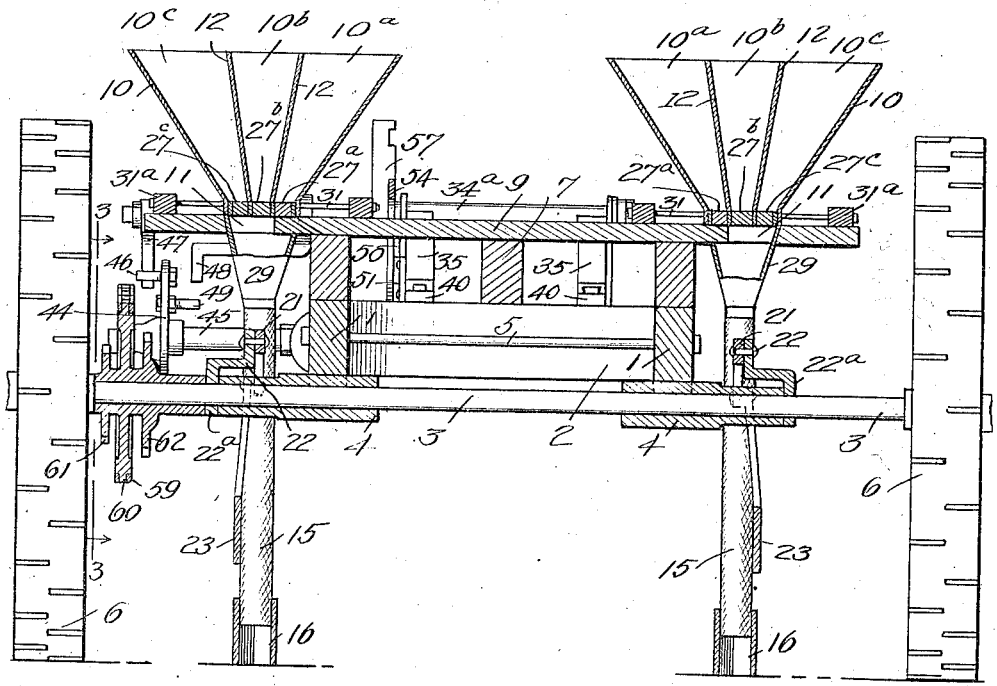
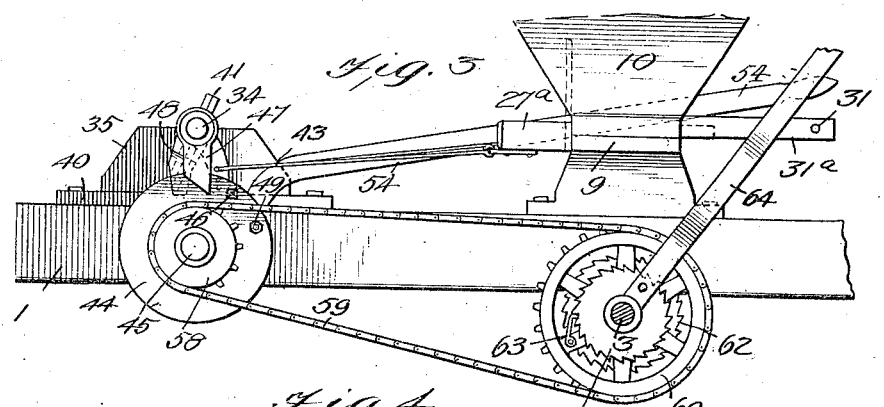
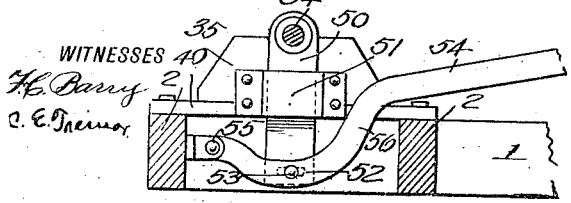
WITNESSES
H. G. Barry
C. E. Trevor
INVENTOR
Allen H. Halstead
BY Munn & Co.
ATTORNEYS A. H. HALSTEAD.
CORN PLANTER.
APPLICATION FILED NOV. 25, 1911.
1,028,110.
Patented June 4, 1912.
3 SHEETS—SHEET 3.
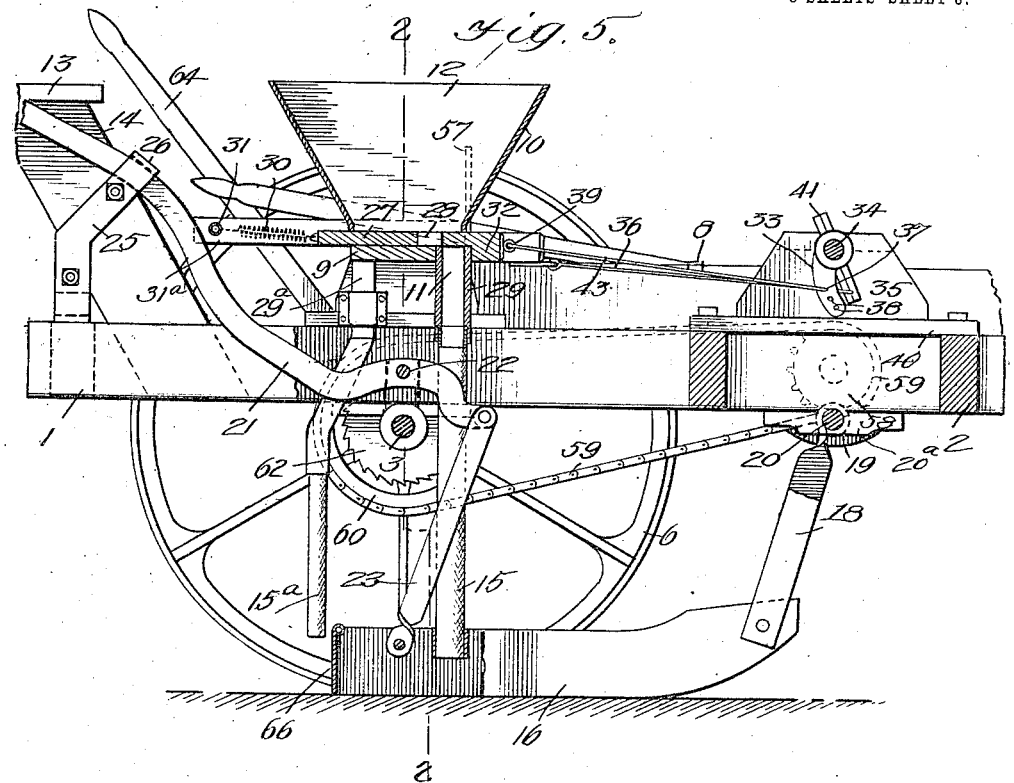
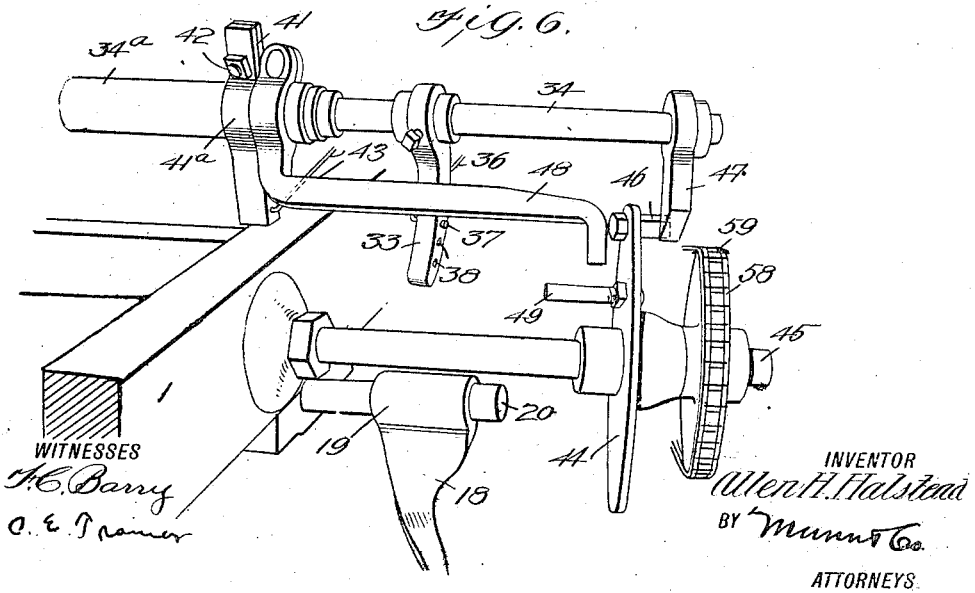

UNITED STATES PATENT OFFICE.

ALLEN H. HALSTEAD, OF SKIDMORE, KANSAS.

CORN-PLANTER.

1,028,110.

Specification of Letters Patent.    Patented June 4, 1912.

Application filed November 25, 1911. Serial No. 662,305.

*To all whom it may concern:*

Be it known that I, ALLEN H. HALSTEAD, a citizen of the United States, and a resident of Skidmore, in the county of Cherokee, State of Kansas, have invented a new and useful Improvement in Corn-Planters, of which the following is a specification.

My invention is an improvement in corn planters and has for its object the provision of means in connection with the planter, for permitting a charge of fertilizer to be deposited with the seed in each hill, or on the hill after the seed has been planted, on both in the hill and on the hill as may be desired, or for permitting one or more kinds of seed to be deposited in each hill, with a charge of fertilizer on the hill.

A further object is to provide a mechanism for disconnecting the tripping mechanism and dropping mechanism to permit the said dropping mechanism to be set at any desired position, to provide for the transverse alinement of the hills.

In the drawings: Figure 1 is a perspective view of the improvement; Fig. 2 is a section on the line 2—2 of Fig. 5; Fig. 3 is a side view of the tripping mechanism; Fig. 4 is a detail side view of the means for disconnecting the tripping shaft from the operating shaft; Fig. 5 is a vertical longitudinal section; and Fig. 6 is a detail perspective view of the tripping mechanism.

In the present embodiment of the invention a frame is provided, consisting of longitudinal beams 1, and connecting cross beams 2, and an axle 3 is journaled in bearings 4 on the under side of the frame. The beams 1 are also connected by cross bolts 5.

Wheels 6 are secured to the ends of the axle, and a tongue 7 is arranged longitudinally of the frame at approximately the center thereof, and is held to the frame by stirrup hangers 8. A plate 9 is arranged transversely of the frame between the wheels, and a grain or seed box 10 is seated on each end of the plate over an opening 11 through the plate.

Each of the boxes 10 is divided into three compartments, an inner compartment $10^a$, an intermediate compartment $10^b$, and an outer compartment $10^c$, by means of partitions 12. The outer and intermediate compartments $10^c$ and $10^b$ communicate with a hose 15 by means of the opening 11 in the plate 9. The inner compartment $10^a$ communicates with a hose $15^a$ by means of a similar opening (not shown) at the rear of the plate. The lower end of hose 15 is received between the sides of a runner or furrow opener 16, and the hose $15^a$ delivers behind the said runner.

The front end of each runner is curved upwardly, and one end of a link 18 is pivoted to the said front end at one end, the other end of the link having a bearing 19 encircling a shaft 20 arranged transversely of the under face of the frame in bearings $20^a$. The rear ends of the runners may be lifted by means of levers 21, each of which is pivoted to a lug 22 on a sleeve $22^a$ on the axle and has one end connected to the runner by a link 23.

Each of the levers may be held with the runner elevated by means of a catch 24 on an arm 25 held by a bracket 26 extending laterally from the frame near the seat 13. Feed slides 27, $27^a$ and $27^b$ are provided for the respective compartments $10^a$, $10^b$ and $10^c$ of each seed box, and each side is provided with an opening 28 adapted to register with the compartment in one position of the slide and with the hose in the other position.

A tube 29 is arranged between compartments $10^b$ and $10^c$ and the hose 15, and a similar tube $29^a$ is arranged between compartment $10^a$ and hose $15^a$, the former tube being of sufficient width to receive material from both compartments. A spring 30 is arranged between the rear end of each slide and a rod 31 held in rearwardly extending bracket arms $31^a$.

The spring 30 acts normally to draw the slide rearwardly, that is, to hold it in the position shown in Fig. 5, with the opening 28 of the slide in register with the box. Each slide is provided with a rib 32 at its front edge, and on its lower face for engaging the plate 9 to limit the rearward movement of the slide.

The front ends of slides $27^b$ and $27^c$ are connected to a crank arm 33 on a shaft 34 supported in blocks 35 on the frame by means of a rod 36. The front end of the rod has an angular lug or hook 37 which engages one of a series of openings 38 in the arm, and the rear end of the rod engages a plate 39 secured between the slides.

Blocks 35 are seated on plates 40, connecting adjacent cross bars 2, and a sleeve 34ª is journaled on the shaft 34 between the arms 37. A cross head 41 is secured to each end of sleeve 34ª, each cross head having a split bearing 41ª encircling the sleeve and secured thereon by a bolt and nut 42.

A rod 43 has one end secured to the cross head at each end of the sleeve, and the other end of the rod is secured to the front end of slide 27ª. A cam disk 44 is secured to one end of a shaft 45 journaled below shaft 34, and the said arm is provided with oppositely extending lateral pins or fingers 46 and 49. An arm 47 is secured to the adjacent end of shaft 34 on the outer side of the cam for engagement by pin 46, and an arm 48 is secured to the adjacent end of sleeve 34ª for engagement by pin 49.

The shaft 34 is journaled in bearing plates 50 (Fig. 4), each of which is slidable vertically in a bearing 51 on the frame. The lower end of each plate 50 is provided with a transverse slot 52, and a bolt 53 is passed through each slot and through a registering opening in a lever 54. Each lever 54 is pivoted at one end to a lug 55 on the frame and is provided with a U-shaped portion 56 adjacent to the lug and to which the plate 50 is connected.

By means of levers 54 but one of which is shown the shaft 34 may be lifted above the blocks 35. A catch 57 is provided for each lever 54 to hold the lever with the shaft elevated. When so held, the arms 47 and 48 are out of contact with the cam fingers. Shaft 45 is provided with a sprocket wheel 58 connected by a chain 59 with a sprocket wheel 60 on the axle 3.

The seat 13 is supported by standards 14 behind the boxes 10, and each runner is composed at its rear end of laterally spaced vertical plates converging at their front ends. A flap or scraper consisting of a plate 66 is hinged to the plates at their upper edges and at their rear ends, and depends against the rear ends. This plate is adapted to cover the seed by drawing the soil into the furrow and smoothing the same to receive the fertilizer.

The axle is provided with ratchet wheels 61 and 62, one on each side of the sprocket wheel 60, and each wheel 61—62 is engaged by a holding pawl 63 (but one of which is shown) on the sprocket wheel 60. A lever 64 is journaled at one end on the axle.

In operation, the respective compartments being filled with seed and fertilizer, when the machine moves forward, the runners 16 open a furrow, and at regular intervals, that is, at each rotation of shaft 45, shaft 34 is oscillated to draw slides 27ᵇ and 27ᶜ forwardly. A charge of grain has meanwhile been received in the opening 28 of each slide, and as the opening 28 passes above opening 11 the seed is dropped into the furrow. Directly after the movement of slides 27ᵇ and 27ᶜ arm 48 is struck by pin 49, and the sleeve 34ª is oscillated to move slide 27ª, and the said slide drops a charge of fertilizer into hose 15ª, which delivers the charge behind the runner on the surface of the ground. Thus two charges of seed may be dropped into each hill, and a charge of fertilizer be dropped on the hill, by a single machine. The arms 46 and 48 are arranged so that the charge from compartment 10ª is dropped practically directly over the charge of seed. After the end of the row has been reached and the machine has been turned, it is desirable that the first hill should be in alinement with the last hill of the preceding row. By means of the mechanism shown in Fig. 4, the shaft 34 and the sleeve 34ª are lifted, until the arms 47 and 48 are out of position for engagement by the pins 46 and 49, after which the sprocket wheel 58 may be turned to set the dropping device at the desired point.

It will be understood that the fertilizer may be dropped in the hill with the grain as well as on the hill. For this purpose, the seed is placed in the compartment 10ᶜ, and the fertilizer is placed in the compartments 10ª and 10ᵇ. A charge of fertilizer is thus dropped in the hill and another charge on the hill.

I claim:—

1. In a planter, a wheel supported frame, a grain box comprising three compartments at each side of the frame, a plate on which the boxes are supported, said plate having a common opening for the outer and central compartment of each box and an opening for the inner compartment, a hose for each opening, a runner below the hose of the outer and central compartments to which the hose delivers, the hose for the inner compartment delivering behind the runner, a slide for each compartment sliding on the plate and having an opening for registering with the compartments or with the opening of the plate, a spring normally holding the slides in rearward position and in register with the compartments, a tripping shaft journaled transversely of the frame, a sleeve on the tripping shaft, radial arms on the sleeve and on the tripping shaft, a link connecting the arm of the shaft to the outer and intermediate slides, a link connecting the arm of the sleeve to the inner slide, a driving shaft below the first-named shaft, a driving connection between the shaft and the axle, a cam wheel on the driving shaft, said wheel having angularly spaced oppositely extending lateral pins, an arm on the end of the tripping shaft for engagement by one of the pins, an arm on the end of the sleeve for engagement by the other pin, and means for lifting the tripping shaft out of engaging position with the operating shaft.

2. In a planter, a wheel supported frame, a grain box comprising three compartments at each side of the frame, a plate on which the boxes are supported, said plate having a common opening for the outer and central compartment of each box and an opening for the inner compartment, a hose for each opening, a runner below the hose of the outer and central compartments to which the hose delivers, the hose for the inner compartment delivering behind the runner, a slide for each compartment sliding on the plate and having an opening for registering with the compartments or with the opening of the plate, a spring normally holding the slides in rearward position and in register with the compartments, a tripping shaft journaled transversely of the frame, a sleeve on the tripping shaft, radial arms on the sleeve and on the tripping shaft, a link connecting the arm of the shaft to the outer and intermediate slides, a link connecting the arm of the sleeve to the inner slide, a driving shaft below the first-named shaft, a driving connection between the shaft and the axle, a cam wheel on the driving shaft, said wheel having angularly spaced oppositely extending lateral pins, an arm on the end of the tripping shaft for engagement by one of the pins, and an arm on the end of the sleeve for engagement by the other pin.

3. In a planter, a wheel supported frame, a grain box comprising three compartments at each side of the frame, a plate on which the boxes are supported, said plate having a common opening for the outer and central compartment of each box and an opening for the inner compartment, a hose for each opening, a runner below the hose of the outer and central compartments to which the hose delivers, the hose for the inner compartment delivering behind the runner, a slide for each compartment sliding on the plate and having an opening for registering with the compartments or with the opening of the plate, a spring normally holding the slides in rearward position and in register with the compartments, a tripping shaft journaled transversely of the frame, a sleeve on the tripping shaft, radial arms on the sleeves and on the tripping shaft, a link connecting the arm of the shaft to the outer and intermediate slides, a link connecting the arm of the sleeve to the inner slide, a driving shaft below the first-named shaft, a driving connection between the shaft and the axle, and a connection between the driving shaft, the tripping shaft and the sleeve for alternately oscillating the tripping shaft and the sleeve.

4. In a planter, a wheel supported frame, a grain box comprising three compartments at each side of the frame, a plate on which the boxes are supported, said plate having a common opening for the outer and central compartment of each box and an opening for the inner compartment, a hose for each opening, a runner below the hose of the outer and central compartments to which the hose delivers, the hose for the inner compartment delivering behind the runner, a slide for each compartment sliding on the plate and having an opening for registering with the compartments or with the opening of the plate, a spring normally holding the slides in rearward position and in register with the compartments, a tripping shaft journaled transversely of the frame, a sleeve on the tripping shaft, a connection between the tripping shaft and the outer and intermediate slides for moving said slides when the shaft is oscillated, a connection between the sleeve and the inner slide for moving the slide when the sleeve is oscillated, and means operated by the axle for alternately oscillating the tripping shaft and the sleeve.

5. In a planter, a wheel supported frame, a grain box comprising three compartments at each side of the frame, a plate on which the boxes are supported, said plate having a common opening for the outer and central compartment of each box and an opening for the inner compartment, a hose for each opening, a runner below the hose of the outer and central compartments to which the hose delivers, the hose for the inner compartment delivering behind the runner, a slide for each compartment sliding on the plate and having an opening for registering with the compartments or with the opening of the plate, means for normally holding the slides in register with the compartment, a connection between the outer and the intermediate slides, and means operated by the axle for alternately moving the connected slides and the inner slides.

6. In a planter, a frame, a grain box at each side of the frame, each of the said boxes having three compartments, a delivery slide for each compartment, a runner below each grain box, means in front of the inner and intermediate compartments for receiving the charge of grain and delivering it to the runner, means behind the inner compartment for receiving a charge and delivering it behind the runner, a connection between the outer and the intermediate slides, and means operated by the axle for moving the connected slides and the single slide in alternation.

7. In a planter, a frame, a grain box at each side thereof, each of the said boxes having a plurality of compartments, a delivery slide for each compartment, a runner below each grain box, means at each side of the frame for conveying the grain from one compartment to the runner, means at each side of the frame for conveying the grain from the other compartment and delivering it behind the runner, and means operated by the movement of the frame for moving the delivering slides in alternation.

ALLEN H. HALSTEAD.

Witnesses:
 EMERSEN HULL,
 W. H. SHAFFER.